United States Patent
Schneider et al.

(10) Patent No.: US 7,421,099 B2
(45) Date of Patent: Sep. 2, 2008

(54) USE OF PAPILLA MAPPING TO DETERMINE A FRICTION-RIDGE SURFACE

(75) Inventors: John K. Schneider, Snyder, NY (US); Jack C. Kitchens, Tonawanda, NY (US)

(73) Assignee: Ultra-Scan Corporation, Amherst, NY (US)

( * ) Notice: Subject to any disclaimer, the term of this patent is extended or adjusted under 35 U.S.C. 154(b) by 34 days.

(21) Appl. No.: 11/465,398

(22) Filed: Aug. 17, 2006

(65) Prior Publication Data

US 2007/0076926 A1  Apr. 5, 2007

Related U.S. Application Data

(60) Provisional application No. 60/708,892, filed on Aug. 17, 2005.

(51) Int. Cl.
*G06K 9/00* (2006.01)

(52) U.S. Cl. .................. 382/124; 382/125; 340/5.53; 340/5.83; 600/445

(58) Field of Classification Search ................. 382/124, 382/125; 340/5.53, 5.83; 600/445
See application file for complete search history.

(56) References Cited

U.S. PATENT DOCUMENTS

| | | | | |
|---|---|---|---|---|
| 5,224,174 A | * | 6/1993 | Schneider et al. | 382/124 |
| 5,647,364 A | * | 7/1997 | Schneider et al. | 600/445 |
| 5,689,576 A | * | 11/1997 | Schneider et al. | 382/124 |
| 5,974,886 A | * | 11/1999 | Carroll et al. | 73/598 |
| 6,993,160 B2 | * | 1/2006 | Miura et al. | 382/115 |
| 7,184,580 B2 | * | 2/2007 | Hamid | 382/124 |

* cited by examiner

*Primary Examiner*—Bhavesh Mehta
*Assistant Examiner*—John B Strege
(74) *Attorney, Agent, or Firm*—Hodgson Russ LLP

(57) ABSTRACT

A method of creating a friction-ridge image is disclosed. An energy transducer is aimed at a body part having skin. The transducer is used to obtain information about the papillae beneath an outer surface of the skin. The information about the papillae is used to obtain information about valleys between the papillae, and a friction-ridge image having friction-ridge valleys that correspond with the valleys between the papillae is created.

41 Claims, 3 Drawing Sheets

Skin section showing fingerprint ridges formed by the dermal papillae

Structure of skin showing friction ridges, pores, sweat glands, and dermal papillae Skin section with part of the epidermis removed to show the individual rows of papillae

USE OF PAPILLA MAPPING TO DETERMINE A FRICTION-RIDGE SURFACE

CROSS-REFERENCE TO RELATED APPLICATIONS

This application claims the benefit of priority to U.S. provisional patent application Ser. No. 60/708,892, filed on Aug. 17, 2005.

FIELD OF THE INVENTION

The present invention relates to devices and methods of identifying an individual using biometrics.

BACKGROUND OF THE INVENTION

Biometric identification systems frequently encounter situations where the body part that is used to establish a biometric identity has been damaged. For example, a friction-ridge surface of a finger (a fingerprint) may be damaged by an accidental burn or abrasion to the finger. Intentional damage to a finger may also impede the ability of a biometric identification system to make a proper identification. Intentional damage may be inflicted in order to prevent identification, for example by abrading, burning or etching the friction-ridge surface. As an example, in Europe people applying for political asylum have burned off their fingerprints in order to avoid having their criminal records discovered. In other situations, terrorists have abraded and acid etched their fingerprints to avoid being identified by security personnel. There is a need for a biometric identification system that is not wholly dependent upon an undamaged friction-ridge skin surface in order to make an identification.

In situations where the friction-ridge surface has been damaged, a biometric identification system may be presented with specimens that are less than optimal for enrollment into a database or for identification purposes. In these situations, it may be advantageous to be able to use other physiological structures that are less susceptible to damage than the friction-ridge surface of the skin. The present invention seeks to utilize physiological differences in sub-surface tissue components. For example, by mapping the valleys between dermal papillae, it is possible to predict what the undamaged friction-ridge surface would look like.

The dermal papillae are small, nipple-like protrusions of the dermis that reach into the epidermis. The papillae bring nutrients and oxygen to the lower layers of epidermal cells. In addition, papillae nourish hair follicles and allow sweat to come to the skin surface to aid in cooling the body.

Rows of papillae form ridges and valleys. The papillae-valleys extend to a substantial depth into the skin. When covered with epidermal cells, the ridges and valleys of the papillae create patterns on the skin, which are commonly called friction-ridges. Fingerprints are the friction-ridges that appear on the fingers. For purposes of illustrating the invention, we will focus on fingerprints, but it should be recognized that the invention may be used with other friction-ridges.

The papillary ridges and valleys develop sometime before birth, and the resulting friction-ridge surface pattern does not change—except to grow larger. Further, the friction-ridge surface pattern is unique for each individual, and can therefore be used for identification purposes.

The papillae are formed from materials that differ in composition from structures surrounding the papillae. The differing compositions allow for detection of the papillae surface by various techniques, and ultimately an image of the papillae surface may be generated. For example, differences in tissue optical opacity and color allow for imaging with optical and infrared techniques. Differences in conductivity may allow for imaging with radio frequency and capacitance techniques. Differences in ultrasonic impedance allows for an ultrasound system to differentiate between the various physiological parts of the skin, including the papillae.

In this document, the term "impedance" is used to refer to the property of a material which resists the propagation of a longitudinal energy wave, such as an ultrasound wave. The impedance, Z, is defined as $Z=r \cdot c$, where r is the material density, and c is the longitudinal propagation velocity of the energy wave in the material. Propagation of the energy wave is dependent partly on the particle mass (which determines the density of the material) and partly on the elastic forces binding the particles together. A fraction of the energy pulse may be reflected whenever there is a change in impedance. The larger the change in impedance, the larger the fraction of energy reflected. The fraction of energy reflected as a result of differences in impedance between two materials can be calculated by the equation, $R=((Z_1-Z_2)/(Z_1+Z_2))^2$, where R is the fraction of the energy reflected, $Z_1$ is the impedance of the first material, and $Z_2$ is the impedance of the second material.

SUMMARY OF THE INVENTION

An embodiment of the invention may make use of physiological features of skin below the epidermis to obtain an image that is representative of a friction-ridge. That image may be sufficiently accurate so as to be suitable for identification purposes. FIGS. 1, 2 and 3, depict the skin on a finger. The ridges of the fingerprint are formed when rows of papillae are covered by the epidermis. Since the perimeter of the papillae lie at the valleys of the fingerprint, by mapping the papillae structures, a means is available for the virtual reconstruction of the fingerprint image or a portion of the fingerprint image.

The friction-ridge surface of the skin may be superficially damaged such that it does not produce a suitable friction-ridge image with traditional imaging systems. The invention may be used to generate a predicted friction-ridge image corresponding to skin that has not been damaged. The invention may make use of partial friction-ridge information available from areas that have not been sufficiently damaged, and augment that partial friction-ridge information with information obtained by mapping the papillae that lie beneath the epidermal layer of the skin and form the basis for the missing ridges of the surface. Alternatively, the invention may be used without partial friction-ridge information to predict the friction-ridge from the dermal papillae.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Generally speaking, the invention may provide a method by which morphological information is obtained from a portion of skin that is below the epidermis and that information is used predict an image of the friction-ridge surface that would likely result. In an embodiment of the invention information about the dermal papillae is obtained, and then that information is used to create an image of the epidermal layer that would likely result from such an arrangement of the dermal papillae.

The invention is described using fingerprints, but the invention is not limited to use with fingerprints. In one embodiment of the invention, it is assumed that the dermal papillae substantially define the structure of the fingerprint, such that valleys in the dermal papillae correspond to valleys in the fingerprint, and ridges of the dermal papillae correspond to ridges in the fingerprint. By using information derived from the dermal papillae and processing this information, the fingerprint valleys may be predicted, thereby allowing for further processing and the eventual reconstruction of a valid fingerprint image.

Figure 4:
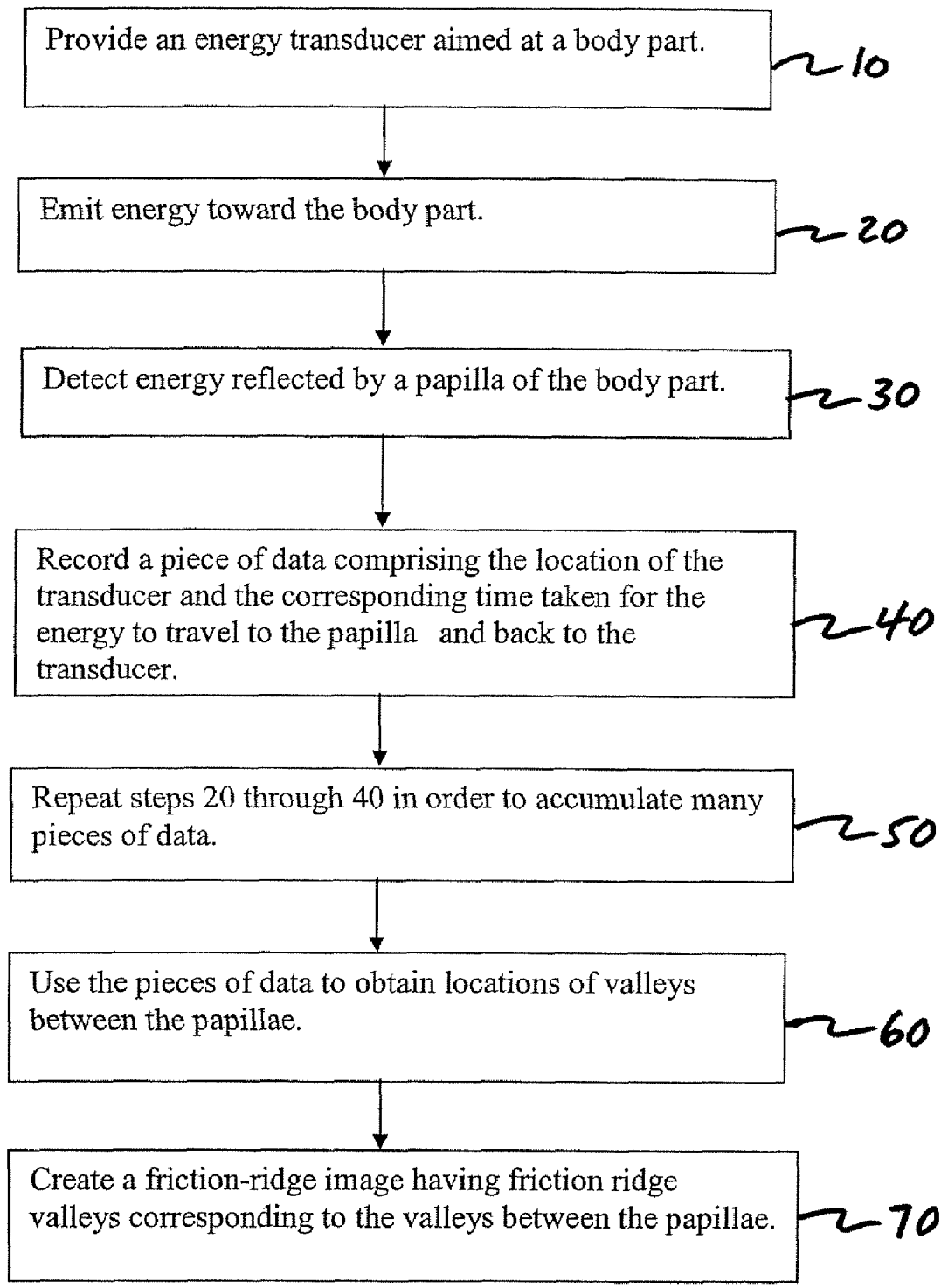
FIG. 4 is a flow chart depicting a method according to the invention.

A method according to the invention is outlined in FIG. 4. In that method, an energy transducer is provided 10. The energy transducer may include an energy emitter and a sensor that is sensitive to the emitted energy. For example, the energy emitted 20 and sensed may be ultrasound, radio, visible light, infrared, or magnetic energy. Further, other types of energy transducers, such as capacitance or tomographic imaging, may be used. The energy transducer may be aimed at a finger and energy from the transducer may be emitted 20 toward the finger. Some of the energy will be reflected from the papillae back toward the transducer. Energy reflected from the papillae may be detected 30. Once the reflected energy is detected, a piece of data may be recorded 40. The piece of data may include the location of the transducer and the time it took the energy to travel to the finger and back to the transducer. In so doing, one piece of data may be created, which corresponds to a particular location on the papillae surface. Many such pieces of data may be obtained 50, and thereby provide information about the papillae surface. The recorded time for each data piece will depend on the distance between the transducer and the reflection surface. The differences in time and transducer location may be used 60 to determine the relative elevation change from one location on the papillae surface to another location on the papillae surface.

By obtaining enough data about the papillae surface, software may be used 60 to identify valleys between the papillae, and their relative locations with respect to each other. By knowing where the papillae-valleys are, it is possible to predict where the valleys of a fingerprint are likely to be, and thereby create 70 a friction-ridge image of the fingerprint. For example, the likely fingerprint-valleys may be positioned to correspond to the papillae-valleys. In this manner, the information about the papillae surface may be used to create 70 a fingerprint image even though the fingerprint may have been removed from the finger.

After the valleys of the fingerprint are predicted by using the information from the papillae, the ridges of the fingerprint may be predicted. For example, a fingerprint ridge may be placed so as to reside at the mid-point between two predicted valleys. Alternatively, the ridges may be predicted using the papillae information. For example, the peaks of the papilla may be used to predict where the fingerprint ridges are likely to be.

In some situations, part of the fingerprint may be obtained. In those situations where only some of the friction-ridge detail is available, it may be possible to use the information about the papillae to provide a predicted partial fingerprint corresponding to those parts of the fingerprint that could not be obtained. In such a method, a partial fingerprint may be obtained, and those areas of the fingerprint that could not be obtained may be identified. Then the papillae information may be used, in the manner described above, to provide a predicted friction-ridge pattern corresponding only to those identified areas. Once the papillae information is used to predict the friction-ridge pattern for an identified area, the predicted pattern may be inserted into the partial fingerprint to provide a more complete image of the fingerprint. In this manner, the time required to generate a fingerprint may be reduced.

Figure 1:
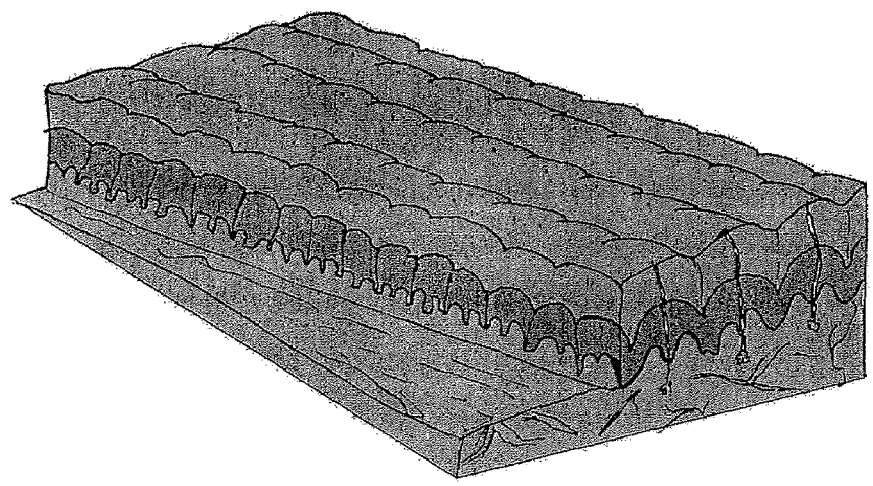
FIG. 1 is a cross-sectional perspective view of the outer portion of human skin tissue showing layers that make up the tissue. Rows of papillae are shown just beneath the surface; these papillae are covered with an epidermal (outer skin) layer that conforms to the papillae and thus make up the friction-ridges. The area between ridges defines the fingerprint valleys.
Figure 2:
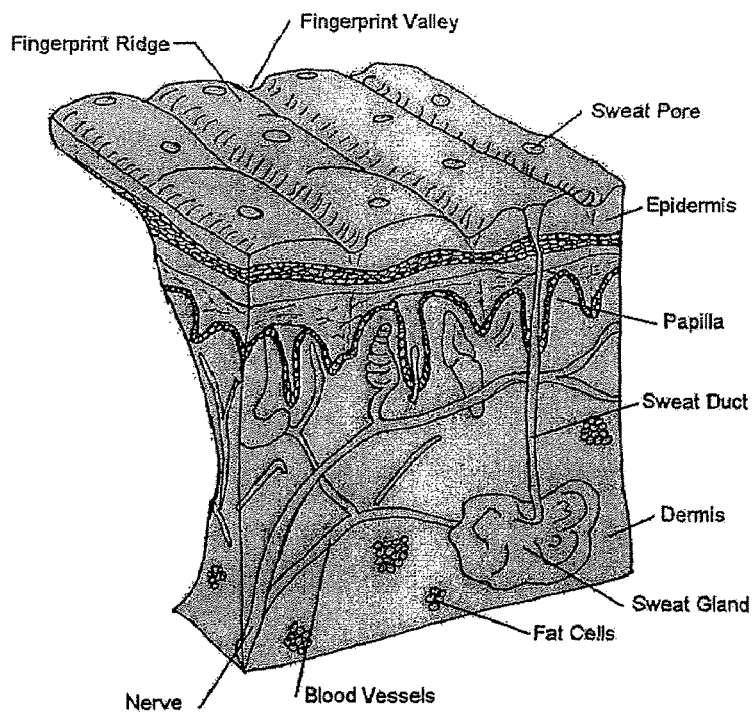
FIG. 2 is an enlarged view of a portion of the skin depicted in FIG. 1.
Figure 3:
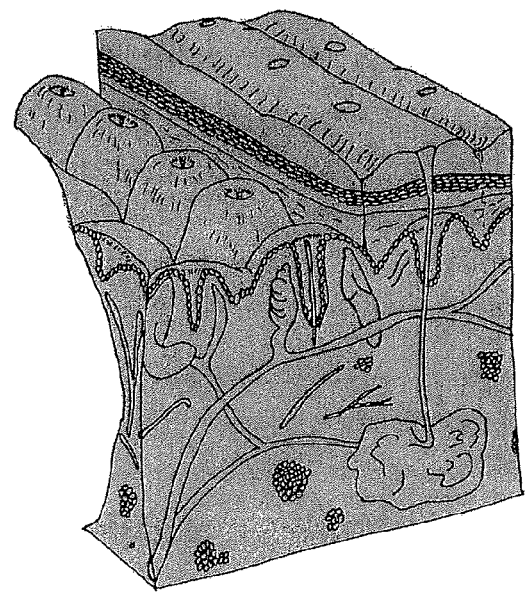
FIG. 3 is an enlarged view of the skin depicted in FIG. 1 showing part of the epidermal layer removed so that some of the papillae beneath the epidermal layer can be more easily seen.
Figure 5:
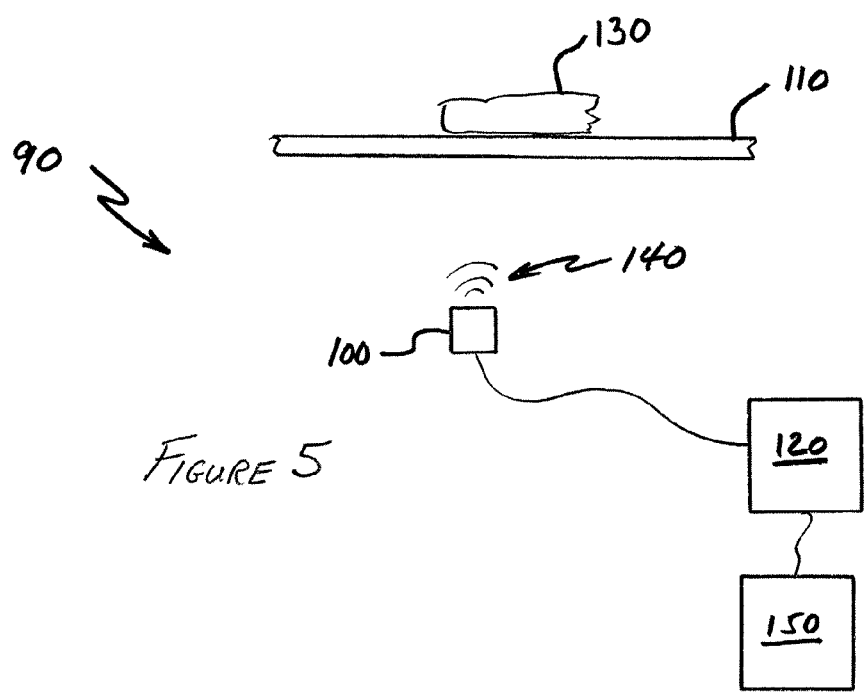
FIG. 5 is a schematic of a device that may be used to carry out the method outlined in FIG. 4.

A system 90 for carrying out the invention is schematically depicted in FIG. 5. That system 90 may include an ultrasonic energy transducer 100, a platen 110 and a data storage device 120. The ultrasound imaging system 90 of FIG. 5 and the corresponding description serves to illustrate the invention, but the invention may be practiced with other systems, including those that use radio waves, high-intensity visible light, infrared light, magnetic energy, capacitance or tomographic imaging.

A finger 130 to be imaged is rested on the platen 110. The ultrasonic energy transducer 100 then may be oriented to direct ultrasonic energy 140 at the finger 130. While sending and receiving ultrasonic pulses 140 to the finger 130, the transducer 100 may be moved relative to the finger 130 so as to obtain information about the papillae of the finger 130. Since the papillae have a different ultrasonic impedance than the physiological structures surrounding the papillae, ultrasonic energy 140 will be reflected from the surfaces of the papillae. The reflected ultrasonic energy 140 may be detected by the transducer 100 and used to determine the location of the papillae surface. It should be noted that other parts of the skin will reflect ultrasonic energy, and through a process known as "range-gating" the reflected energy 140 corresponding to the papillae surface may be identified and distinguished from energy 140 reflected from other skin surfaces.

The motion of the transducer 100 may be substantially parallel to the platen 110 surface on which the finger 130 is rested. The location of the transducer 100 when a reflected energy pulse is detected may be recorded in the data storage device 120 for future use by a computer 150. Furthermore, the time taken for the ultrasonic pulse to reach the papilla surface and return to the transducer 100 at that location may be recorded and correlated with the transducer location. In this manner, one piece of data corresponding to a papilla surface may be obtained.

The recorded time corresponds to the distance between the ultrasonic transducer 100 and the reflection surface. When many such data points are obtained, it is possible to know the shape of the papilla surface. In this manner, information may be obtained about the papillae of the finger 130, and the varying depths of the papillae surface may be known. The varying depths of the papillae surface may be used to determine the valleys of the papillae surface. There are many software packages available that can be used on the computer 150 to identify the papillae-valleys. Examples of such software packages include, Axum made by MathSoft Inc. of Cambridge, Mass., MacGRIDZO made by Rockware Inc. of Golden, Colo., QuickSurf made by Schreiber Instruments Inc. of Denver, Colo., S-Stat made by SRIE Pty Ltd. of Australia, Surf 3D (3D Surf) made by Schreiber Instruments Inc. of Denver, Colo., Surface III+ made by the Kansas Geological Survey of Lawrence, Kans., Surfer made by Golden Software Inc. of Golden, Colo., TECKON made by Tecsoft Inc. of Amagansett, N.Y., Transform made by Fortner Research LLC of Sterling, Va., Vortex made by Hurricane Graphics Inc. of the United States of America, and Z/CON made by Rockware Inc. of Golden, Colo.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of creating a friction-ridge image, comprising:
providing an energy transducer aimed at a body part having skin;
using the transducer to detect reflected energy to obtain information about the papillae beneath an outer surface of the skin;
using the information about the papillae to obtain information about valleys between the papillae; and
creating a friction-ridge image having friction-ridge valleys that correspond with the valleys between the papillae,
wherein using the transducer includes detecting the time needed to travel from the transducer to the papillae and back to the transducer.

2. The method of claim 1, wherein the information obtained by the transducer includes a distance between the transducer and a surface of the papillae.

3. The method of claim 1, wherein the information about valleys between the papillae includes the relative location of the valleys between the papillae.

4. The method of claim 1, further comprising:
using the information about the papillae to obtain information about ridges defined by the papillae, and
creating the friction-ridge image such that ridges in the image correspond with the ridges defined by the papillae.

5. The method of claim 1, wherein creating the friction-ridge image includes positioning ridges between the valleys between the papillae.

6. The method of claim 1, further comprising:
obtaining a partial friction-ridge image;
identifying an area for which the friction-ridge image is missing detail to provide an identified area; and
wherein the created friction-ridge image corresponds to the identified area and the created friction-ridge image is inserted into the partial friction-ridge image to provide a more complete image of the friction-ridge.

7. The method of claim 1, wherein the energy transducer includes an ultrasound sensor.

8. The method of claim 1, wherein the energy transducer includes a radio frequency sensor.

9. The method of claim 1, wherein the energy transducer includes a capacitance sensor.

10. The method of claim 1, wherein the energy transducer includes a light sensor.

11. The method of claim 1, wherein the energy transducer includes an infrared sensor.

12. The method of claim 1, wherein the energy transducer includes a magnetic resonance sensor.

13. The method of claim 1, wherein the energy transducer operates by tomography.

14. A method of creating a friction-ridge image, comprising:
providing an energy transducer aimed at a body part having skin;
using the transducer to obtain information about the papillae beneath an outer surface of the skin;
using the information about the papillae to obtain information about valleys between the papillae; and
creating a friction-ridge image having friction-ridge valleys that correspond with the valleys between the papillae,
wherein the information obtained by the transducer includes a distance between the transducer and a surface of the papillae.

15. The method of claim 14, wherein using the transducer includes detecting reflected energy.

16. The method of claim 14, wherein using the transducer includes detecting the time needed to travel from the transducer to the papillae and back to the transducer.

17. The method of claim 14, wherein the information about valleys between the papillae includes the relative location of the valleys between the papillae.

18. The method of claim 14, further comprising:
using the information about the papillae to obtain information about ridges defined by the papillae, and
creating the friction-ridge image such that ridges in the image correspond with the ridges defined by the papillae.

19. The method of claim 14, wherein creating the friction-ridge image includes positioning ridges between the valleys between the papillae.

20. The method of claim 14, further comprising:
obtaining a partial friction-ridge image;
identifying an area for which the friction-ridge image is missing detail to provide an identified area; and
wherein the created friction-ridge image corresponds to the identified area and the created friction-ridge image is inserted into the partial friction-ridge image to provide a more complete image of the friction-ridge.

21. The method of claim 14, wherein the energy transducer includes an ultrasound sensor.

22. The method of claim 14, wherein the energy transducer includes a radio frequency sensor.

23. The method of claim 14, wherein the energy transducer includes a capacitance sensor.

24. The method of claim 14, wherein the energy transducer includes a light sensor.

25. The method of claim 14, wherein the energy transducer includes an infrared sensor.

26. The method of claim 14, wherein the energy transducer includes a magnetic resonance sensor.

27. The method of claim 14, wherein the energy transducer operates by tomography.

28. A method of creating a friction-ridge image, comprising:
providing an energy transducer aimed at a body part having skin;
using the transducer to obtain information about the papillae beneath an outer surface of the skin;

using the information about the papillae to obtain information about valleys between the papillae creating a friction-ridge image having friction-ridge valleys that correspond with the valleys between the papillae, obtaining a partial friction-ridge image;

identifying an area for which the friction-ridge image is missing detail to provide an identified area; and wherein the created friction-ridge image corresponds to the identified area and the created friction-ridge image is inserted into the partial friction-ridge image to provide a more complete image of the friction-ridge.

29. The method of claim 28, wherein using the transducer includes detecting reflected energy.

30. The method of claim 28, wherein using the transducer includes detecting the time needed to travel from the transducer to the papillae and back to the transducer.

31. The method of claim 28, wherein the information obtained by the transducer includes a distance between the transducer and a surface of the papillae.

32. The method of claim 28, wherein the information about valleys between the papillae includes the relative location of the valleys between the papillae.

33. The method of claim 28, further comprising:
using the information about the papillae to obtain information about ridges defined by the papillae, and
creating the friction-ridge image such that ridges in the image correspond with the ridges defined by the papillae.

34. The method of claim 28, wherein creating the friction-ridge image includes positioning ridges between the valleys between the papillae.

35. The method of claim 28, wherein the energy transducer includes an ultrasound sensor.

36. The method of claim 28, wherein the energy transducer includes a radio frequency sensor.

37. The method of claim 28, wherein the energy transducer includes a capacitance sensor.

38. The method of claim 28, wherein the energy transducer includes a light sensor.

39. The method of claim 28, wherein the energy transducer includes an infrared sensor.

40. The method of claim 28, wherein the energy transducer includes a magnetic resonance sensor.

41. The method of claim 28, wherein the energy transducer operates by tomography.

* * * * *